(12) United States Patent
Hashimoto et al.

(10) Patent No.: US 6,221,935 B1
(45) Date of Patent: Apr. 24, 2001

(54) RESIN CONCRETE COMPOSITION AND MOLDED ARTICLE THEREOF

(75) Inventors: Yoshitomi Hashimoto, Funabashi; Toshio Kanai, Yachiyo; Yutaka Furuya, Wakayama, all of (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/357,656

(22) Filed: Jul. 20, 1999

(30) Foreign Application Priority Data

Jul. 22, 1998 (JP) .................................................. 10-206346

(51) Int. Cl.$^7$ ............................. C08L 67/06; C08L 47/00; C08K 3/34; C08K 3/40

(52) U.S. Cl. ......................... 523/526; 523/500; 523/513; 523/514; 523/521; 523/527; 523/218; 523/219

(58) Field of Search .................................... 523/500, 513, 523/514, 521, 523, 527, 218, 219, 526

(56) References Cited

U.S. PATENT DOCUMENTS

| 4,611,015 | * | 9/1986 | Hefner, Jr. et al. | 523/523 |
| 4,777,208 | * | 10/1988 | Hefner, Jr. | 523/521 |
| 4,816,503 | | 3/1989 | Cunningham et al. | 523/521 |

FOREIGN PATENT DOCUMENTS

| 4-149050 | 5/1992 | (JP) . |
| WO 87/04442 | 7/1987 | (WO) . |

* cited by examiner

*Primary Examiner*—Peter Szekely
(74) *Attorney, Agent, or Firm*—Armstrong, Westerman, Hattori, McLeland & Naughton LLP

(57) ABSTRACT

A resin concrete composition and its molded article are provided, the resin concrete, even with a reduced resin content, having an excellent flowability, which is an important property in a molding operation, and necessitating no shrinkage reduction agent, and the molded article having no cracks and being highly strong. The resin concrete composition comprises (A) a resin composition containing (a) an unsaturated polyester of an unsaturated acid, a di- and/or trialkylene glycol, and dicyclopentadiene and (b) a polymerizable unsaturated monomer, (B) an aggregate, and (C) a filler.

9 Claims, No Drawings

RESIN CONCRETE COMPOSITION AND MOLDED ARTICLE THEREOF

BACKGROUND OF THE INVENTION

1. Field of the Invention

The present invention relates to resin concrete compositions from which molded articles having no cracks can be obtained with little shrinkage without using a shrinkage reducing agent as well as being excellent in flowability and the hardened articles thereof having high strengths even with reduced resin contents. The present invention also relates to molded articles of the resin concrete compositions.

2. Description of Related Art

Resin concrete compositions containing an unsaturated polyester resin composition which incorporate an unsaturated polyester and a polymerizable unsaturated monomer, an aggregate, and a filler have been known, and industrially, resin concrete compositions have been used for products related to water supply and sewers, such as manholes, pipes, and drainage basins, for repairing cracks in cement concrete, for molded articles for landscaping such as garden lanterns, and for the like. Conventional resin concretes, particularly those having no coarse aggregate and having a relatively high resin content such as 15 to 20%, normally incorporate a shrinkage reducing agent consisting of a thermoplastic resin such as polystyrene and polyvinyl acetate in order to avoid cracking due to shrinkage during hardening in a molding process, and clinging to the mold.

However, since a shrinkage reducing agent itself cannot be hardened, problems such as the following have occurred:

The obtained molded article has a reduced strength.

The surface of the molded article becomes sticky.

The molded products are irregular in their dimensions and strength because of differences in shrinkage reducing effect due to different temperatures of the exothermic reaction during hardening, caused by variations in seasons, atmospheric temperatures, temperatures in the curing oven, or the like.

With a certain type of shrinkage reducing agent, the appearance of the molded product deteriorates since the shrinkage reducing agent is poorly compatible with the unsaturated polyester resin, and therefore when they are combined to make a resin concrete, the flowability and the ease of degassing are degraded.

The necessity of increasing the resin content results in an increase in the cost.

In addition, use of dicyclopentadiene-modified unsaturated polyester as the unsaturated polyester in the resin concrete has been known, for example, as disclosed in International Publication No. WO87/04442 and Japanese Unexamined Patent Application, First Publication (Kokai) No. Hei 4-149050. However, there were problems in that the strengths of the resin concrete molded articles were low, and the cracking resistance was insufficient.

BRIEF SUMMARY OF THE INVENTION

An object of the present invention is to provide a resin concrete composition which shrinks little and is highly flowable, that is, a resin concrete composition which, even with a reduced resin content, has an excellent flowability, which is an important property in a molding operation, and necessitates no shrinkage reduction agent, and a molded article of which has no cracks and is very strong. Another object of the present invention is to provide such a molded article.

As a result of diligent research in the above objects, the present inventors have achieved the present invention.

The present invention provides a resin concrete composition and a molded article thereof, the resin concrete composition comprising (A) a resin composition containing (a) an unsaturated polyester of an unsaturated acid, a di- and/or trialkylene glycol, and dicyclopentadiene and (b) a polymerizable unsaturated monomer, (B) an aggregate, and (C) a filler. Preferably, the amount of dicyclopentadiene to be incorporated in the unsaturated polyester is 1 to 55% by weight. Preferably, the proportion of the unsaturated polyester (a) is 80 to 60 parts by weight, and the proportion of the polymerizable unsaturated monomer (b) is 20 to 40 parts by weight, with respect to 100 parts by weight of the total amount of the unsaturated polyester (a) and the polymerizable unsaturated monomer (b). In addition, preferably, the number-average molecular weight of the unsaturated polyester (a) is 400 to 1500.

The present invention will be described in detail in the following.

DETAILED DESCRIPTION OF THE INVENTION

A resin concrete composition according to the present invention may be used for products related to water supply and sewers, such as manholes, pipes, and drainage basins, for repairing cracks in cement concrete, for molded articles for landscaping such as garden lanterns, and for the like, and comprises a resin, an aggregate, and a filler.

The resin concrete composition according to the present invention comprises an unsaturated polyester resin composition (A) containing an unsaturated polyester (a) and a polymerizable unsaturated monomer (b), an aggregate (B), and a filler (C). When hardening is performed, the resin concrete composition further comprises a hardening accelerator (D) and a hardener (E).

For the unsaturated polyester (a) used in the present invention, an unsaturated acid (a1), a di- and/or trialkylene glycol (a2), and dicyclopentadiene (a3) are used as raw materials. The unsaturated acid (a1) may be an unsaturated dibasic acid such as maleic anhydride and fumaric acid. If the necessity of adjusting the exothermic temperature during hardening, or adjusting the properties of the unsaturated polyester arises, a saturated dibasic acid such as orthophthalic acid, isophthalic acid, terephthalic acid, adipic acid, and the like may be used together to such an extent that it does not deteriorate the effects of the invention.

The di- and/or trialkylene glycol (a2) may be selected from dialkylene glycols such as diethylene glycol and dipropylene glycol and trialkylene glycols such as triethylene glycol. In order to impart desirable resin concrete properties which are suitable for application, an alkylene glycol such as ethylene glycol, propylene glycol, and butylene glycol may be used together to such an extent that it does not deteriorate the effects of the invention.

The amount of the dicyclopentadiene (a3) may be 1 to 55% by weight, preferably 25 to 50% by weight, of the raw material components of the unsaturated polyester (a).

Examples of processes for producing the unsaturated polyester modified by dicyclopentadiene are as follows, any of which may be applied to the present invention:

(1) A one-step synthetic process in which the modification occurs concurrently by putting the acid, the glycol, and dicyclopentadiene in a vessel at the same time and condensing them.

(2) A two-step synthetic process in which the acid and the glycol are condensed, and in the middle of the condensation dicyclopentadiene is added thereto to let the modification proceed.

(3) A process in which an addition reaction is allowed to occur between an acid anhydride and dicyclopentadiene in the presence of water to produce a monoester, and thereafter the glycol and the acid are added thereto and the reaction is allowed to occur.

In addition, endo-methylenetetrahydrophthalic acid may be present, which is produced from the reaction between cyclopentadiene, which is generated by a thermal dissociation of dicyclopentadiene, and the unsaturated acid. The unsaturated polyester (a) of the present invention preferably has a structure which is obtained by the addition reaction of the unsaturated acid (a1) to the di- and/or trialkylene glycol (a2), then the addition reaction of dicyclopentadiene.

For the polymerizable unsaturated monomer (B) in the present invention, one which is normally used in an unsaturated polyester resin composition may be used to such an extent that it does not deteriorate the effects of the invention. Examples thereof are styrene, α-methylstyrene, chlorostyrene, dichlorostyrene, divinylbenzene, t-butylstyrene, vinyltoluene, vinyl acetate, diaryl phthalate, triaryl cyanurate, acrylic ester, methacrylic ester, and the like; and an unsaturated monomer or unsaturated oligomer which is crosslinkable with the resin, such as methyl (meth) acrylate, ethyl (meth)acrylate, n-butyl (meth)acrylate, i-butyl (meth)acrylate, t-butyl (meth)acrylate, 2-ethylhexyl (meth)acrylate, lauryl (meth)acrylate, cyclohexyl (meth) acrylate, benzyl (meth)acrylate, stearyl (meth)acrylate, tridecyl (meth)acrylate, dicyclopentenyloxyethyl (meth) acrylate, ethylene glycol monomethyl ether (meth)acrylate, ethylene glycol monoethyl ether (meth)acrylate, ethylene glycol monobutyl ether (meth)acrylate, ethylene glycol monohexyl ether (meth)acrylate, ethylene glycol mono-2-ethylhexyl ether (meth)acrylate, diethylene glycol monomethyl ether (meth)acrylate, diethylene glycol monoethyl ether (meth)acrylate, diethylene glycol monobutyl ether (meth)acrylate, diethylene glycol monohexyl ether (meth) acrylate, diethylene glycol mono-2-ethylhexyl ether (meth) acrylate, dipropylene glycol monomethyl ether (meth) acrylate, dipropylene glycol monoethyl ether (meth) acrylate, dipropylene glycol monobutyl ether (meth) acrylate, dipropylene glycol monohexyl ether (meth) acrylate, dipropylene glycol mono-2-ethylhexyl ether (meth)acrylate, diethylene glycol di(meth)acrylate, dipropylene glycol di(meth)acrylate, neopentyl glycol di(meth) acrylate, dimethacrylate of PTMG, 1,3-butylene glycol di(meth)acrylate, 1,6-hexanediol di(meth)acrylate, 2-hydroxy-1,3-dimethacryloxypropane, 2,2-bis[4-(methacryloxyethoxy)phenyl]propane, 2,2-bis[4-(methacryloxydiethoxy)phenyl]propane, 2,2-bis[4-(methacryloxypolyethoxy)phenyl]propane, tetraethylene glycol diacrylate, diacrylate modified by an addition product of bisphenol A with ethylene oxide (n=2), diacrylate modified by an addition product of isocyanuric acid with ethylene oxide (n=3), and pentaerythritol diacrylate monostearate. A single compound or two or more compounds in combination may be used as the polymerizable unsaturated monomer (b).

The number-average molecular weight of the unsaturated polyester (a) accoridng to the present invention is preferably 400 to 1500, more preferably 400 to 1200, and particularly preferably 400 to 1000. If the number-average molecular weight of the unsaturated polyester (a) is outside the above range, the flowability, which is one of the effects of the present invention, cannot be obtained. Preferably, in the unsaturated polyester resin composition of the present invention, the proportion of the unsaturated polyester (a) is 80 to 60 parts by weight, and the proportion of the polymerizable unsaturated monomer (b) is 20 to 40 parts by weight, with respect to 100 parts by weight of the total amount of the unsaturated polyester (a) and the polymerizable unsaturated monomer (b). If the proportions of the unsaturated polyester (a) and the polymerizable unsaturated monomer (b) are outside the above ranges, problems may occur in reduction of shrinkage, physical properties, and moldability. The viscosity of the resin composition at normal temperature (25° C.) is preferably 0.5 to 50 poise, and more preferably 1 to 4 poise.

In the unsaturated polyester resin composition of the present invention, a conventional unsaturated polyester resin composition containing another saturated acid, unsaturated acid, glycol, and polymerizable unsaturated monomer or a dicyclopentadiene-modified unsaturated polyester resin composition which differs from one used in the present invention may be mixed to such an extent that it does not deteriorate the effects of the invention, preferably in an amount of 0.1 to 25% by weight.

Preferable examples of the aggregate (c) are crushed stone, sandstone, kansui stone (marble), limestone, silica stone, silica sand, and river sand. In order to make the resin concrete composition and its molded article light, a lightweight aggregate such as sintered shale, pearlite, shirasu balloons, and glass balloons may be used. The average particle diameter of the aggregate (c) varies depending on the size and the thickness of the molded article, however, it is preferably 0.05 to 50 mm, more preferably 0.1 to 20 mm, and particularly preferably 0.1 to 10 mm. The amount of the aggregate (c) added is preferably 12.5 to 92.5% by weight of the resin concrete composition. Alternatively, silica sand No. 1 (particle diameter: 5 to 2.5 mm), silica sand No. 2 (particle diameter: 2.5 to 1.2 mm), silica sand No. 3 (particle diameter: 1.2 to 0.6 mm), silica sand No. 4 (particle diameter: 0.6 to 0.3 mm), silica sand No. 5 (particle diameter: 0.3 to 0.15 mm), silica sand No. 6 (particle diameter: 0.15 to 0.074 mm), and silica sand No. 7 (particle diameter: 0.074 mm or less) as prescribed in JIS G 5901-1968 may also be used.

Examples of the filler (D) are carbonate powder, fly ash, clay, alumina powder, silica stone powder, talc, silica powder, glass powder, mica, aluminium hydroxide, and marble chips. The average particle diameter of the filler (D) is preferably about 0.5 to 20 $\mu$m. The amount of the filler (D) added is preferably 2.5 to 62.5% by weight of the resin concrete composition.

Examples of the hardening accelerator (E) are metallic soaps such as cobalt naphthenate, cobalt octenoate, vanadyl octenoate, copper naphthenate, and barium naphthenate; metal chelates such as vanadyl acetylacetate, cobalt acetylacetate, and iron acetylacetonate; and amines such as N,N-dimethylamino-p-benzaldehyde, N,N-dimethylaniline, N,N-diethylaniline, methylhydroxyethylaniline, N,N-dimethyl-p-toluidine, N,N-bis(2-hydroxyethyl)-p-toluidine, 4-N,N-dimethylaminobenzaldehyde, 4-N,N-bis(2-hydroxyethyl) aminobenzaldehyde, 4-methylhydroxyethylaminobenzaldehyde, N,N-bis(2-hydroxypropyl)-p-toluidine, N-ethyl-m-toluidine, triethanolamine, m-toluidine, diethyltriamine, pyridine, phenylmorpholine, pyperidine, and diethanolaniline.

The amount of the hardening accelerator (E) added is preferably 0.001 to 5 parts by weight with respect to 100 parts by weight of the total amount of the unsaturated polyester (a) and the polymerizable unsaturated monomer (b). A metallic soap or an amine accelerator can be preferably used in the present invention. The hardening accelerator (E) may be added to the resin (a) in advance, or it may be added at the time of molding.

As the hardener (F) a known hardener, for example, an azo comopound such as azoisobutyronitrile, and an organic peroxide such as a diacyl peroxide, a peroxyester, a hydroperoxide, a dialkyl peroxide, a ketone peroxide, a peroxyketal, an alkyl perester, and a percarbonate, and specifically methyl ethyl ketone peroxide, benzoyl peroxide, and the like may be used. The hardener may be properly selected in view of kneading conditions, curing temperature, and the like.

The amount of the hardener (F) added is preferably 0.1 to 4 parts by weight, preferably 0.3 to 3 parts by weight, with respect to 100 parts by weight of the total amount of the unsaturated polyester (a) and the polymerizable unsaturated monomer (b). As the hardener (F), two types may be used in combination.

Examples of a hardening retarder which may be used in the present invention are trihydroxybenzene, toluhydroquinone, 1,4-naphthoquinone, p-benzoquinone, hydroquinone, benzoquinone, trimethylhydroquinone, hydroquinone mmonomethyl ether, p-tert-butylcatechol, 2,6-di-tert-butyl-4-methylphenol, 2,6-di-tert-butyl-4-dimethylamino-p-cresol, and copper naphthenate. The amount of the hardening retarder to be used is preferably 0.0001 to 0.1 parts by weight with respect to 100 parts by weight of resin solid contents.

The resin concrete composition containing the above raw materials can be obtained preferably by combining 25 to 5 parts by weight of the unsaturated polyester resin composition in which the unsaturated polyester (a) is diluted with the polymerizable unsaturated monomer (b) and 75 to 95 parts by weight in total of the aggregate (c) and the filler (D).

In the present invention, various additives may be used such as a mold releasing agent, an ultraviolet absorber, a pigment, a viscosity reducer, an age resistor, a plasticizer, a flame retarder, a stabilizer, a reinforcing material, and a photo-hardener.

The following molding methods or the like may be normally applied to the resin concrete composition of the present invention to produce a molded article for practical use:

A cast molding method, in which the resin concrete composition is poured into a mold, and hardened at a normal or heated temperature.

A centrifugal molding method, in which the resin concrete composition is poured into a cylindrical mold, thereafter the mold is rotated, a uniform thickness of the resin concrete composition is formed by the centrifugal force of the rotation, and the resin concrete composition is hardened at a normal or heated temperature.

A compression molding method, in which the resin concrete composition is poured into matching molds, thereafter the molds are compressed by a molding machine, and the resin concrete composition is hardened at a normal or heated temperature.

Examples of molded articles which can be obtained are molded articles related to civil engineering and construction such as manholes, drainage basins, building blocks, pavement blocks, lids, pipes, and repairing materials; molded artificial marble articles; molded articles for landscaping; chairs; benches; boxes for installing underground information-, communication- and electric power-related utilities; molded articles related to the information industry; and molded articles related to electrical power.

EXAMPLES

The present invention will be described by way of examples in the following. However, the present invention should not be limited to the examples. "Parts" herein indicates parts by weight.

Synthesis Example 1

Synthesis of Dicyclopentadiene-Modified Unsaturated Polyester (D-1)

746 parts of dicyclopentadiene and 554 parts of maleic anhydride were put in a 2-liter four neck flask equipped with a stirrer, a reflux condenser, a tube for introducing inert gas, a thermometer, and a dropping device. The temperature was raised to 125° C., thereafter 102 parts of water was added dropwise over 1.5 hours, and the reaction was allowed to proceed until the acid value reached 220 at a temperature of 120 to 130° C. Then, 300 parts of diethylene glycol was added, the temperature was gradually raised to 205° C., and the reaction was terminated when the acid value reached about 40. Then, 0.0800 parts of toluhydroquinone and 0.0800 parts of t-butylcatechol were added, and dicyclopentadiene-modified unsaturated polyester (D-1) was obtained.

Synthesis Example 2

Synthesis of Dicyclopentadiene-Modified Unsaturated Polyester (D-2)

702 parts of dicyclopentadiene and 521 parts of maleic anhydride were put in a 2-liter four neck flask equipped with a stirrer, a reflux condenser, a tube for introducing inert gas, a thermometer, and a dropping device. The temperature was raised to 125° C., thereafter 96 parts of water was added dropwise over 1.5 hours, and the reaction was allowed to proceed until the acid value reached 220 at a temperature of 120 to 130° C. Then, 178 parts of dipropylene glycol and 199 parts of triethylene glycol were added, the temperature was gradually raised to 205° C., and the reaction was terminated when the acid value reached about 40. Then, 0.0800 parts of toluhydroquinone and 0.0800 parts of t-butylcatechol were added, and dicyclopentadiene-modified unsaturated polyester (D-2) was obtained.

Comparative Synthesis Example 1

Synthesis of Unsaturated Polyester (UP-1) for Comparative Examples 157 parts of ethylene glycol, 384 parts of propylene glycol, 748 parts of phthalic anhydride, and 248 parts of maleic anhydride were put in a 2-liter four neck flask equipped with a stirrer, a reflux condenser, a tube for introducing inert gas, a thermometer, and a dropping device. The temperature was raised to 210° C., and 11 hours later, after it was confirmed that the acid value reached 40, the reaction was terminated. Then, 0.0700 parts of toluhydroquinone and 0.0700 parts of t-butylcatechol were added, and unsaturated polyester (D-1) was obtained.

Comparative Synthesis Example 2

Synthesis of Unsaturated Polyester (UP-2) for Comparative Examples 809 parts of dicyclopentadiene and 601 parts of maleic anhydride were put in a 2-liter four neck flask equipped with a stirrer, a reflux condenser, a tube for introducing inert gas, a thermometer, and a dropping device. The temperature was raised to 125° C., thereafter 110 parts of water was added dropwise over 1.5 hours, and the reaction was allowed to proceed until the acid value reached 220 at a temperature of 120 to 130° C. Then, 190 parts of ethylene glycol was added, the temperature was gradually raised to 205° C., and the reaction was terminated when the acid value reached about 40. Then, 0.0800 parts of toluhydroquinone and 0.0800 parts of t-butylcatechol were added, and dicyclopentadiene-modified unsaturated polyester (UP-2) was obtained.

Examples 1 and 2

The dicyclopentadiene-modified unsaturated polyester (D-1) or (D-2) was diluted with styrene and kneaded with the other components according to the proportions prescribed in Table 1 to produce a resin concrete composition, which was poured into a triple mortar mold, which is defined by JIS R5201, to fill it up. The resin concrete was hardened at normal temperature, and after the resin concrete was kept still for seven days, measurement of the shrinkage rate and a test for the strength were conducted. In addition, a molded article in which a nut was embedded was molded, and the appearance after hardening was observed. Moreover, a resin concrete composition which contains all the same components but the 6% cobalt naphthenate and the 55% methyl ethyl ketone peroxide in the same proportions was tested for the flowability.

The results are shown in Table 2. The calcium carbonate was "NS-100" (trade name, a product of Nippon Funka Kogyo K.K.), the silica sands No. 7 and No. 4 were products of Sanei Silica K.K., and the 55% methyl ethyl ketone peroxide was "PERMEK N" (trade name, a product of NOF Corporation).

Comparative Examples 1 to 4

The unsaturated polyester (UP-1) or (UP-2) was diluted with styrene and kneaded with the other components according to the proportions prescribed in Table 1 to produce a resin concrete composition, which was poured into a triple mortar mold, which is defined by JIS R5201, to fill it up. The resin concrete was hardened at normal temperature, and after the resin concrete was kept still for seven days, measurement of the shrinkage rate and a test for the strength were conducted. In addition, a molded article in which a nut was embedded was molded, and the appearance after hardening was observed. Moreover, a resin concrete composition which contains all the same components but the 6% cobalt naphthenate and the 55% methyl ethyl ketone peroxide in the same proportions was tested for the flowability.

The results are shown in Table 2. The calcium carbonate, the silica sands No. 7 and No. 4, and the 55% methyl ethyl ketone peroxide were of the same types as those used in the Examples, and the shrinkage reducing agent used was a 30% by weight solution of polystyrene resin in styrene.

Examples 3 and 4

The dicyclopentadiene-modified unsaturated polyester (D-1) or (D-2) was kneaded with the other components according to the proportions prescribed in Table 3 to produce a resin concrete composition, which was poured into a triple mortar mold, which is defined by JIS R5201, to fill it up. The resin concrete was hardened at normal temperature, and after the resin concrete was kept still for seven days, measurement of the shrinkage rate and a test for the strength were conducted. In addition, a molded article in which a nut was embedded was molded, and the appearance after hardening was observed.

The results are shown in Table 4. The calcium carbonate, the silica sands No. 7 and No. 4, and the 55% methyl ethyl ketone peroxide were of the same types as those used above.

Comparative Examples 5 to 9

The unsaturated polyester (UP-1) or (UP-2) was kneaded with the other components according to the proportions prescribed in Table 3 to produce a resin concrete composition, which was poured into a triple mortar mold, which is defined by JIS R5201, to fill it up. The resin concrete was hardened at normal temperature, and after the resin concrete was kept still for seven days, measurement of the shrinkage rate and a test for the strength were conducted.

The results are shown in Table 4. The calcium carbonate, the silica sands No. 7 and No. 4, the 55% methyl ethyl ketone peroxide, and the shrinkage reducing agent were of the same types as those used in Comparative Example 1.

Methods of Evaluating the Properties of the Molded Articles

Evaluation of Slump Flow Value

The resin concrete composition of the components prescribed in the tables was filled into a cup of 40 mm in top diameter, 50 mm in bottom diameter, and 74 mm in height, and then the cup was raised over a flat glass plate which was maintained horizontal so as to let the resin concrete composition spread. Fifteen minutes later, the diameters in two directions crossing at a right angle of the resin concrete composition were measured, and the average of the measurements was defined as the slump flow value.

Evaluation of Cracking

In order to evaluate cracking, in a mold for producing a rectangular parallelepiped molded article of 40 mm×40 mm×1000 mm, two nuts were inserted at a distance of 900 mm and fixed to an inner surface of the mold by two bolts respectively inserted from outside of the mold, and a molded article was obtained. The molded article obtained under stress from shrinkage during hardening was visually inspected for cracking generated around the nuts.

Evaluation of Strength

A test piece was made using a triple mortar mold defined by JIS R-5201, and the flexural strength and the compressive strength were measured according to the method defined by JIS R-5201.

Evaluation of Conformability

The resin concrete composition was poured into a triple mortar mold defined by JIS R5201, and the conformability was evaluated by the following five criteria according to visual inspection during forming.

5: The resin concrete composition conformed to the mold immediately after the mold was filled with the composition and vibrated. (Good conformability)

4: The resin concrete composition conformed to the mold soon after the mold was filled with the composition and vibrated. (Fairly good conformability)

3: The resin concrete composition conformed to the mold in a little while after the mold was filled with the composition and vibrated. (Mediocre conformability)

2: The resin concrete composition did not conform to the mold for a long time after the mold was filled with the composition and vibrated. (Rather poor conformability)

1: The resin concrete composition hardly conformed to the mold after the mold was filled with the composition and vibrated. (Poor conformability)

TABLE 1

| (Component) | Example 1 | Example 2 | Comparative Example 1 | Comparative Example 2 | Comparative Example 3 | Comparative Example 4 |
|---|---|---|---|---|---|---|
| D-1 | 98 | | | | | |
| D-2 | | 95 | | | | |
| UP-1 | | | 87 | 79 | 85 | |
| UP-2 | | | | | | 98 |
| Styrene | 42 | 45 | 53 | 61 | 67 | 42 |
| Shrinkage reducing agent | | | | | 38 | |
| 6% Cobalt naphthenate | 0.70 | 0.70 | 0.70 | 0.70 | 0.95 | 0.70 |
| 55% Methyl ethyl ketone peroxide | 2.10 | 2.10 | 2.10 | 2.10 | 2.85 | 2.10 |
| Calcium carbonate | 239 | 239 | 239 | 239 | 225 | 239 |
| Silica sand No. 7 (particle diameter: 0.074 mm or less) | 239 | 239 | 239 | 239 | 225 | 239 |
| Silica sand No. 4 (particle diameter: 0.6 to 0.3 mm) | 382 | 382 | 382 | 382 | 360 | 382 |

(Values in parts by weight)

TABLE 2

| | Example 1 | Example 2 | Comparative Example 1 | Comparative Example 2 | Comparative Example 3 | Comparative Example 4 |
|---|---|---|---|---|---|---|
| (Resin property) | | | | | | |
| Number-average molecular weight of polyester | 600 | 700 | 1500 | 1500 | 1500 | 600 |
| Viscosity of polyester diluted with styrene (poise) | 2.0 | 2.0 | 5.5 | 2.0 | 2.0 | 2.0 |
| Nonvolatile content (%) | 70 | 68 | 62 | 56 | 56 | 70 |
| (Resin concrete property) | | | | | | |
| Resin content (%) | 14 | 14 | 14 | 14 | 19 | 14 |
| Slump flow value (mm) | 170 | 170 | 145 | 165 | 170 | 170 |
| Flexural strength (kgf/cm$^2$) | 319 | 305 | 305 | 296 | 212 | 247 |
| Compressive strength (kgf/cm$^2$) | 1067 | 1033 | 1072 | 1006 | 817 | 1010 |
| Linear shrinkage (%) | 0.33 | 0.35 | 0.48 | 0.63 | −0.08 | 0.34 |
| Cracking around inserted portions | Not Found | Not Found | Found | Found | Not Found | Found |

TABLE 3

| (Component) | Example 3 | Example 4 | Comparative Example 5 | Comparative Example 6 | Comparative Example 7 | Comparative Example 8 | Comparative Example 9 |
|---|---|---|---|---|---|---|---|
| D-1 | 56 | | | | | | |
| D-2 | | 54 | | | | | |
| UP-1 | | | 62 | 56 | 45 | 45 | |
| UP-2 | | | | | | | 56 |
| Styrene | 24 | 26 | 38 | 44 | 35 | 35 | 24 |
| Shrinkage reducing agent | | | | | | 20 | |
| 6% Cobalt naphthenate | 0.40 | 0.40 | 0.50 | 0.50 | 0.40 | 0.50 | 0.40 |
| 55% Methyl ethyl ketone peroxide | 1.20 | 1.20 | 1.50 | 1.50 | 1.20 | 1.50 | 1.20 |
| Calcium carbonate | 153 | 153 | 150 | 150 | 153 | 150 | 153 |
| Silica sand No. 7 (particle diameter: 0.074 mm or less) | 204 | 204 | 200 | 200 | 204 | 200 | 204 |
| Silica sand No. 4 (particle diameter: 0.6 to 0.3 mm) | 204 | 204 | 200 | 200 | 204 | 200 | 204 |
| Silica sand No. 1 (particle diameter: 5 to 2.5 mm) | 358 | 358 | 350 | 350 | 358 | 350 | 358 |

(Values in parts by weight)

TABLE 4

|  | Example | | Comparative Example | | | | |
|---|---|---|---|---|---|---|---|
|  | 3 | 4 | 5 | 6 | 7 | 8 | 9 |
| (Resin property) | | | | | | | |
| Number-average molecular weight of polyester | 600 | 700 | 1500 | 1500 | 1500 | 1500 | 600 |
| Viscosity of polyester diluted with styrene (poise) | 2.0 | 2.0 | 5.5 | 2.0 | 2.0 | 2.0 | 2.0 |
| Nonvolatile content (%) | 70 | 68 | 62 | 56 | 56 | 56 | 70 |
| (Resin concrete property) | | | | | | | |
| Resin content (%) | 8 | 8 | 10 | 10 | 8 | 10 | 8 |
| Mold conformability | 5 | 5 | 3 | 4 | 2 | 2 | 5 |
| Flexural strength (kgf/cm$^2$) | 278 | 275 | 265 | 250 | 203 | 210 | 219 |
| Compressive strength (kgf/cm$^2$) | 1120 | 1110 | 1090 | 1080 | 920 | 945 | 1000 |
| Linear shrinkage (%) | 0.25 | 0.28 | 0.45 | 0.60 | 0.45 | 0.19 | 0.27 |
| Cracking around inserted portions | Not Found | Not Found | Found | Found | Found | Not Found | Found |

What is claimed is:

1. A resin concrete composition comprising:
   (A) a resin composition containing
      (a) an unsaturated polyester of an unsaturated acid, a glycol component consisting of a di- and/or trialkylene glycol, and dicyclopentadiene, wherein the amount of the dicyclopentadiene is 25 to 50% by weight of the unsaturated polyester, and
      (b) a polymerizable unsaturated monomer,
   (B) an aggregate, and
   (C) a filler.

2. A resin concrete composition according to claim 1, wherein the proportion of the unsaturated polyester (a) is 80 to 60 parts by weight, and the proportion of the polymerizable unsaturated monomer (b) is 20 to 40 parts by weight, with respect to 100 parts by weight of the total amount of the unsaturated polyester (a) and the polymerizable unsaturated monomer (b).

3. A resin concrete composition according to claim 1, wherein the number-average molecular weight of the unsaturated polyester (a) is 400 to 1500.

4. A molded article obtained by molding a resin concrete composition according to claim 1.

5. A molded article obtained by molding a resin concrete composition according to claim 2.

6. A molded article obtained by molding a resin concrete composition according to claim 3.

7. A molded article obtained by molding a resin concrete composition according to claim 4.

8. A resin concrete composition according to claim 1, wherein the number-average molecular weight of the unsaturated polyester (a) is 400 to 1000.

9. A molded article obtained by molding a resin concrete composition according to claim 8.

* * * * *